Oct. 28, 1952 J. FOSTER 2,615,431
SERVO MECHANISM
Filed Jan. 26, 1949 3 Sheets-Sheet 1

Inventor
J. Foster
By Glasser Downing Seebold
Attys

Patented Oct. 28, 1952

2,615,431

UNITED STATES PATENT OFFICE 2,615,431

SERVO MECHANISM

John Foster, Manchester, England, assignor to B. & S. Massey Limited, Manchester, England, a British company Application January 26, 1949, Serial No. 72,936
In Great Britain February 5, 1948

4 Claims. (Cl. 121—41)

This invention has for its object to provide sensitive or quickly responsive fluid pressure servo control mechanism for moving parts of machines such as the rams or valves of fluid pressure operated hammers, presses or the like, which ensures practically immediate reversal of the fluid control valves when the direction of movement of the control handle or lever is reversed, thus obviating the time lag at reversals usually occasioned whilst the open valve is moved to its closed position. The improved mechanism is of the type in which the control handle or lever, which operates the fluid inlet and exhaust valves, is coupled to a part moved by the fluid pressure so that a movement of said part resets the control handle or lever and necessitates further movement being given to the latter if further movement of said part is required.

The invention consists in fluid pressure servo control mechanism comprising a piston connected by its stem to the part to be actuated, a valve fitting containing inlet and exhaust valves for the cylinder containing the piston, each of the said valves being loaded in one direction by the pressure applied to the piston acting upon a diaphragm or piston connected to the valve, and in the other direction by a spring, means to regulate simultaneously the spring loading of said valves and so the pressures at which they open and shut, and a handle or control lever fulcrumed upon said stem for moving said means, so that the pressure loading of the valves is regulated by the conjoint movements of the control handle or lever and the piston stem, and by the pressure on the diaphragms.

The invention further consists in fluid pressure servo control mechanism comprising a piston connected by its stem to the part to be actuated, a valve fitting mounted upon the said stem containing inlet and exhaust valves for the cylinder containing the piston, each of the said valves being loaded in one direction by the pressure applied to the piston acting upon a diaphragm or piston connected to the valve, and in the other direction by a spring, means slidable upon the stem to regulate simultaneously the spring loading of said valves and so the pressures at which they open and shut, and a handle or control lever fulcrumed upon said stem for moving said means upon the stem, so that the pressure loading of the valves is regulated by the conjoint movements of the control handle or lever and the piston stem, and by the pressure on the diaphragms.

The invention further consists in the arrangement of two sets of inlet and exhaust valves in fittings upon the piston stem for controlling fluid to and from the opposite sides of the piston.

Referring to the accompanying explanatory drawings.

$a$ indicates the piston which by its stem $b$ and parts (not shown) connected thereto actuates for example the rams or valves of fluid pressure operated hammers, presses or the like. It is located in a cylinder $c$ and loaded in one direction by a spring $d$. The stem $b$ is hollow as shown at $e$ for a portion of its length and has a cross passage $f$ at the upper end of the bore $e$ which leads to an inlet valve fitting $g$ at one side and an exhaust valve fitting $h$ at the other side of the stem $b$. Said inlet and exhaust valve fittings are secured upon the stem $b$ as shown and have an inlet valve $i$ and an exhaust valve $j$ respectively therein. The inlet valve $i$ seats in the end of the pipe $k$ by which compressed air is supplied to the control device and is held in a cup like part $m$ loaded by the spring $n$ and secured in a sleeve $o$ attached to the diaphragm $p$ loaded by the spring $q$. The exhaust valve $j$ seats on the outlet branch $r$ and is carried in the sleeve like part $s$ secured to the diaphragm $t$ loaded by the spring $u$.

Figure 1:
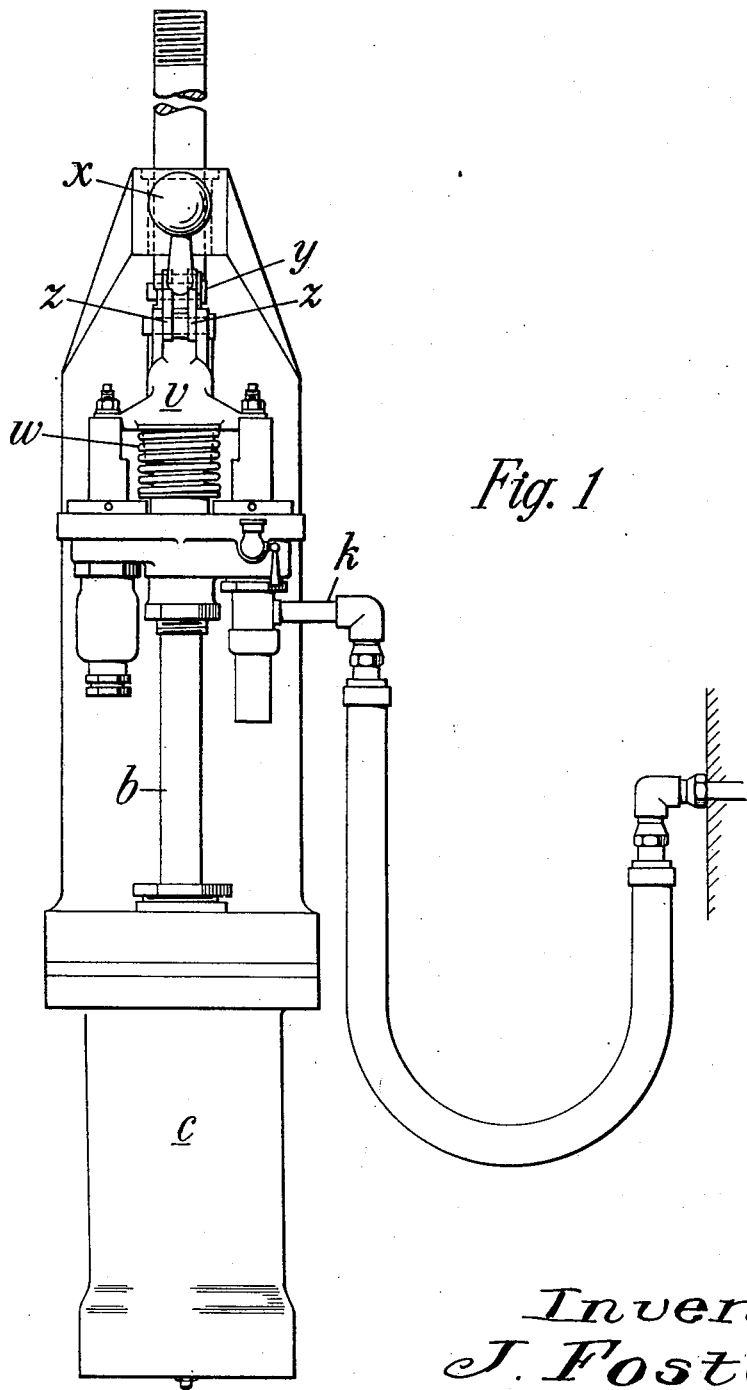
Figure 1 is an elevation and Figure 2 a part sectional elevation taken at right angles to Figure 1 showing a fluid pressure servo control mechanism constructed in one convenient form in accordance with this invention.
Figure 2:
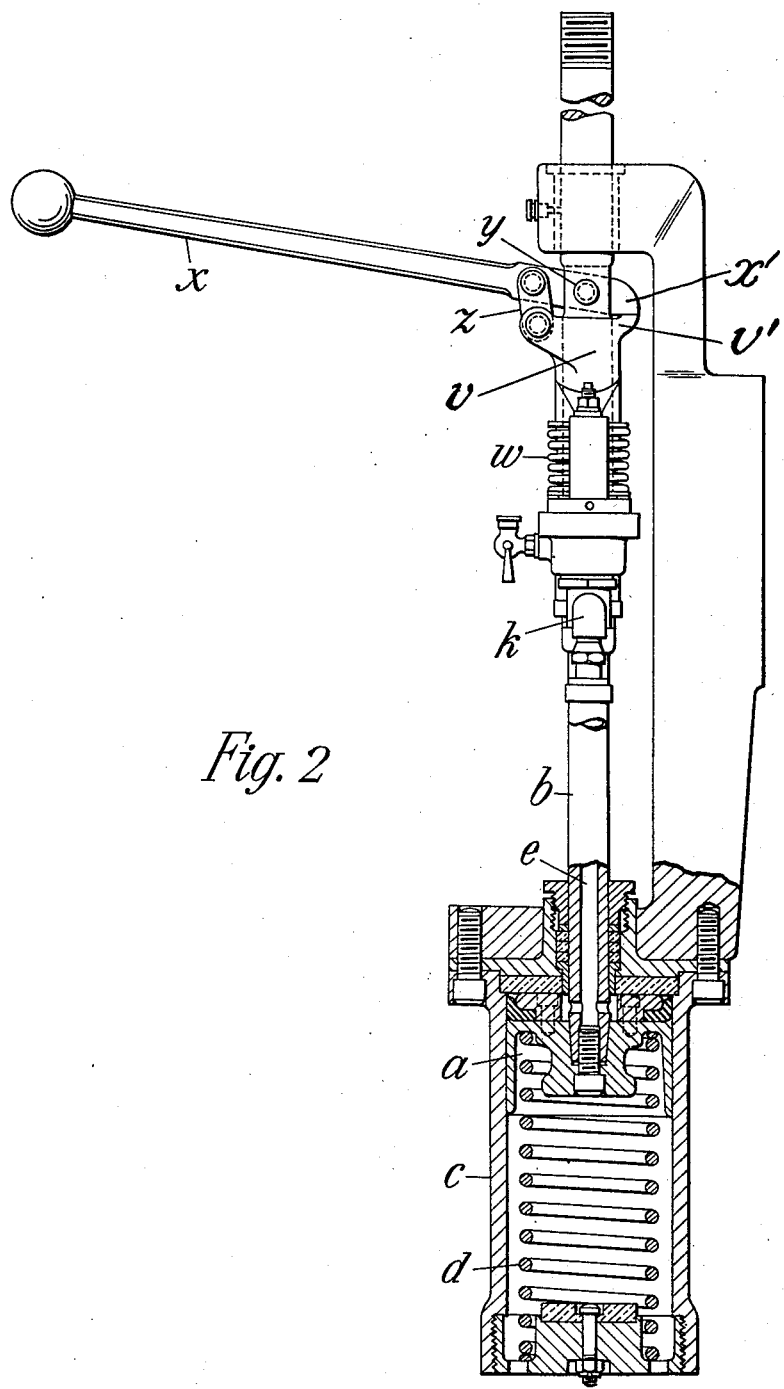
Figure 3:
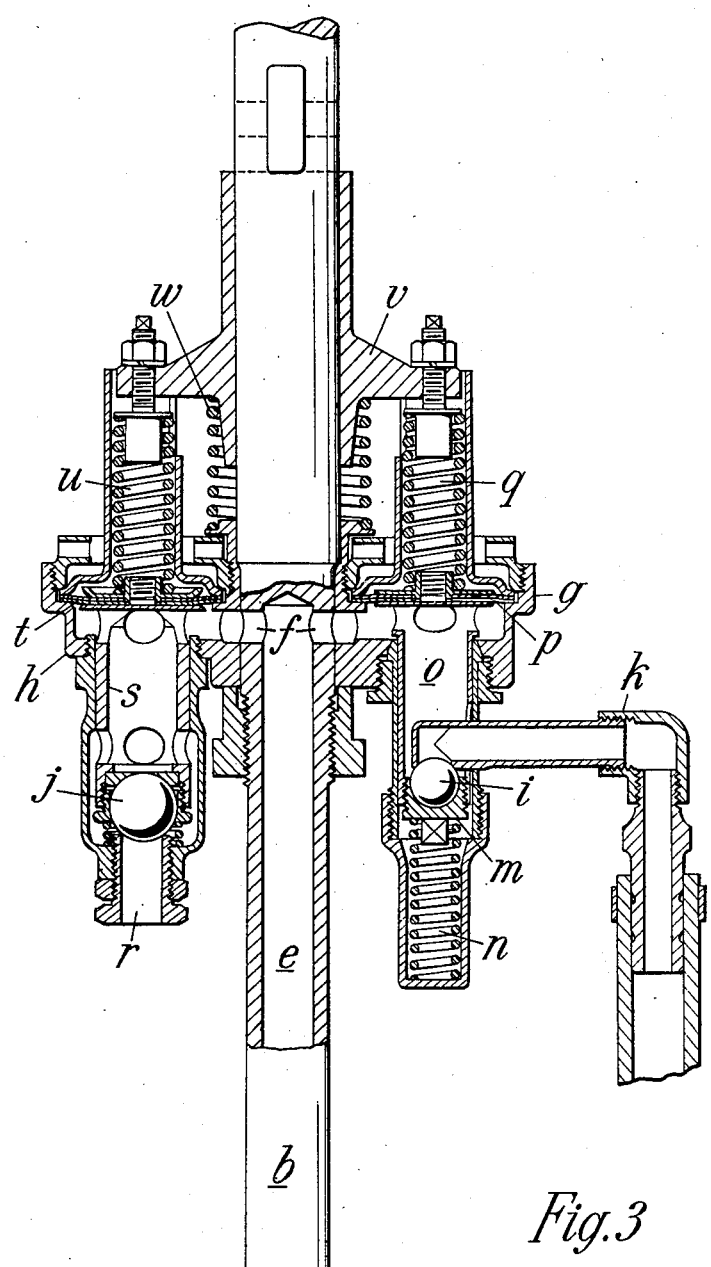
Figure 3 is a sectional elevation through the valve fitting showing the inlet and exhaust valves.

The compression of the springs $q$ and $u$ is controlled by a crosshead $v$ axially movable along the stem $b$, its movement in one direction being due to the spring $w$ and in the other direction being regulated by the hand lever $x$ fulcrumed in the stem $b$ at $y$ and connected to the crosshead by links $z$. The crosshead $v$ and lever $x$ have cooperating abutting ends $v'$ and $x'$ respectively, as shown in Fig. 2. It will be seen that movement of the handle $x$ to depress the crosshead applies increased pressure between the exhaust valve $j$ and its seat and reduces the pressure between the inlet valve and its seat. These pressure conditions are reversed when the handle $x$ is raised.

Assuming that the handle $x$ is moved downwards, the crosshead $v$ is thereby moved downwards on the stem $b$ and causes the springs $q$ and $u$ to be compressed. The spring $q$ acting through the diaphragm $p$ and sleeve $o$ tends to lower the seat of the inlet valve $i$ against the pressure of the spring $n$ and this may result in the opening of the valve $o$ by the fluid pressure in the pipe $k$. Such fluid pressure will pass up through the sleeve $o$, act on the diaphragm $p$ to oppose the spring $q$ and pass via the hollow interior $e$ of the stem $b$ to the top of the piston $a$, where it will cause downward movement of the piston $a$ in the cylinder $c$ against the pressure of the spring $d$.

The spring $u$ will through the diaphragm $t$ and sleeve $s$ apply an increased load to the exhaust valve $j$ which will hold it shut, but the inlet pressure acting in the space beneath the diaphragm $t$ will oppose the pressure of the spring $u$.

It should be noted that if the pressure of the spring $q$ on the inlet diaphragm $p$ exceeds that of the fluid pressure underneath, the inlet valve $i$ opens to allow flow of fluid. This flow continues until the pressure underneath the diaphragm $p$ balances that of the spring $q$ above. Since the inlet and exhaust valve springs $q$ and $u$ are identical and equally loaded and the effective areas of diaphragm subjected to fluid pressure are the same, the exhaust valve $j$ remains closed during the filling period. The exhaust valve reaches the point of opening when the fluid pressure below the diaphragm $t$ balances that of the spring $u$ above. This state of balance of inlet and exhaust valves is upset by movement of the handlever $x$.

If now the piston $a$ moves downwards, and we will asume that the handle $x$ is held in the position to which it was lowered, the stem $b$ will be lowered and this will carry with it the inlet and exhaust valve fitting secured to the stem $b$. The result will be that the spring $q$ will be moved away from the part of the crosshead which loads the spring, and likewise the spring $u$ will be moved away from the part of the crosshead $v$ which loads the spring $u$. Thus the load on the inlet valve $o$ will be reduced and the valve will close and the load on the exhaust valve $j$ will likewise be reduced and the exhaust valve can open. Further movement of the piston $a$ will not therefore take place. If the inlet pressure acting on the diaphragms $p$ and $t$ when the inlet valve $i$ is open, becomes sufficient, the said diaphragms will be moved and will increase the load on the inlet valve so that it will close and reduce the load on the exhaust valve so that it will open.

The movement of the piston $a$ will depend on the build up or inter-action of the spring load on the valves $i$ and $j$ and the fluid pressure acting on the diaphragms $p$ and $t$. If a piston movement should be in any way greater than that of the handlever $x$, and therefore greater than intended by the operator, the pressure of the springs $q$ and $u$ is relaxed and the inlet valve $i$ closes and the exhaust valve $j$ opens. The exhaust valve remains open until the fluid pressure below its diaphragm $t$ equals that of the spring $u$ above. At this point a new state of balance between external or spring load, piston and handlever exists. In other words, the mechanism remains stationary so long as the spring and fluid pressure forces remain balanced but as soon as this balance is upset, either by movement of the handlever $x$ or variation in the load against which the piston $a$ is operating, movement takes place and continues until the balance is restored.

It will be appreciated that the pressure in the cylinder $c$ acts on the diaphragms $p$ and $t$ against the pressure of their springs $q$ and $u$ so that there is always a balancing action between the springs and the pressure in the cylinder $c$.

When the handle $x$ is moved to cause the valves $i$ and $j$ to open or close and held in any position, there is, due to the consequent movement of the stem $b$, a balancing action produced tending to neutralise the effect of the handle movement upon the valves. This, unless the handle is further moved, results in the piston $a$ being brought to rest in a position corresponding with the new or adjusted position of the handle $x$.

By arranging the inlet and exhaust valves and their spring loading means so that the spring loads on the two valves are adjusted simultaneously and not successively when the control lever is moved, a more accurate control of the piston movements and so of the position of the part actuated by the piston is obtained.

With my improvement, the momentarily non-operating or closed valve $i$ or $j$ is always ready to come into action or be opened immediately on reversal of the control lever or handle $x$ in whatever position this may be.

My improved servo unit can be arranged to develop a heavy force which is directly proportional to the small force exerted on the control lever or handle $x$, and provides for a progressive increase or decrease of such force, with a minimum of lost motion and air consumption.

What I claim is:

1. Fluid pressure servo control mechanism comprising a piston connected by its stem to the part to be actuated, a cylinder containing said piston, a spring in said cylinder loading said piston in one direction, a valve fitting secured to said stem, inlet and exhaust valves in said fitting for supplying fluid to and exhausting it from said cylinder, diaphragms associated with the inlet and the exhaust valves, a spring loading each diaphragm at one side, the other side being open to the pressure in the cylinder, means slidable upon said stem to regulate simultaneously the spring loading of said valves and so in part the pressures at which they open and shut, and a handle fulcrumed upon said stem for moving said means, so that the opening and closing respectively of the valves is controlled by the conjoint movements of the control handle and the piston stem, and by the pressure on the diaphragms.

2. Fluid pressure servo control mechanism as claimed in claim 1, in which the piston stem is hollow and forms the means for supplying fluid to and exhausting it from the cylinder, one side of each diaphragm being open to the pressure in the cylinder through the said hollow stem.

3. Fluid pressure servo control mechanism as claimed in claim 2, in which the means slidable upon the stem to regulate the spring loading of the valves is a crosshead upon the stem, parts upon the ends of said crosshead engaging the valve loading springs and a spring engaging between the valve fitting and crosshead to move the latter away from the valve fitting.

4. Fluid pressure servo control mechanism comprising a piston connected by its stem to the part to be actuated, a cylinder containing said piston, a spring in said cylinder loading the piston in one direction, a valve fitting secured to said stem, an inlet valve in said fitting, an inlet branch in which said inlet valve seats, a spring forcing said inlet valve on to its seat in said branch, an apertured sleeve regulating the spring pressure on the valve, a diaphragm in the fitting connected to said sleeve, a spring loading said diaphragm at one side, whilst the other side is exposed to the pressure in the cylinder, an exhaust valve in said fitting, an outlet branch on the fitting on which the exhaust valve seats, an apertured sleeve holding the exhaust valve on its seat, a diaphragm in the fitting connected to said sleeve, a spring loading the diaphragm at one side whilst its other side is exposed to the pressure in the cylinder via its associated apertured sleeve, a crosshead slidable along the piston stem and loading at its ends the two springs of the two diaphragms, and a handle fulcrumed upon the piston stem for moving said crosshead upon the stem, the interior of the valve fitting communicating with the cylinder via holes in the piston stem and the hollow interior of the latter.

JOHN FOSTER.

REFERENCES CITED

The following references are of record in the file of this patent:

UNITED STATES PATENTS

| Number | Name | Date |
|---|---|---|
| 1,328,437 | Lang | Jan. 20, 1920 |
| 1,630,809 | Simpson | May 31, 1927 |
| 1,952,147 | Stahl | Mar. 27, 1934 |